Feb. 12, 1957      O. P. BULLOCK      2,780,928
AUTOMOBILE AIR COOLER
Filed Nov. 13, 1953      5 Sheets-Sheet 1
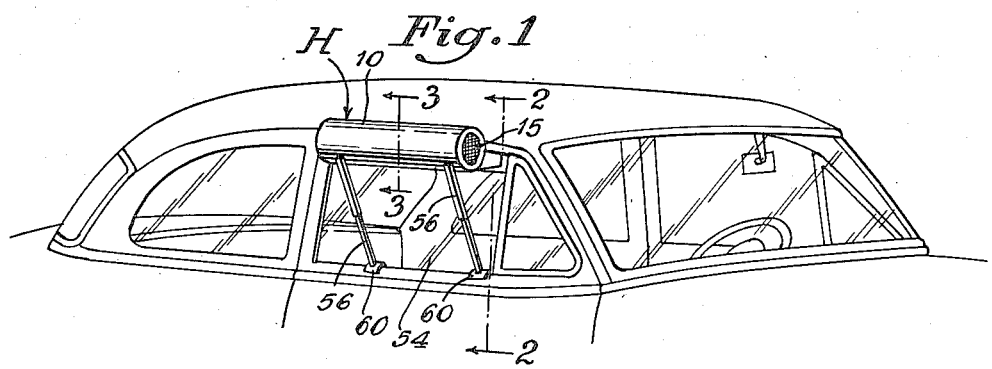
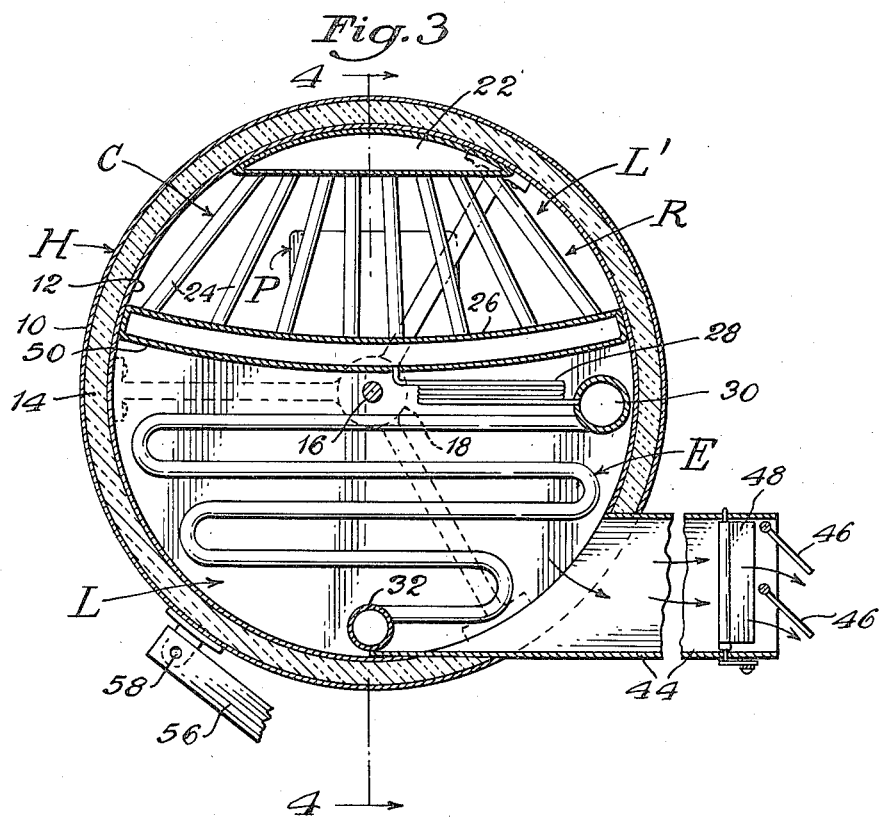
Inventor
Oakle P. Bullock
by Parker & Carter
Attorneys

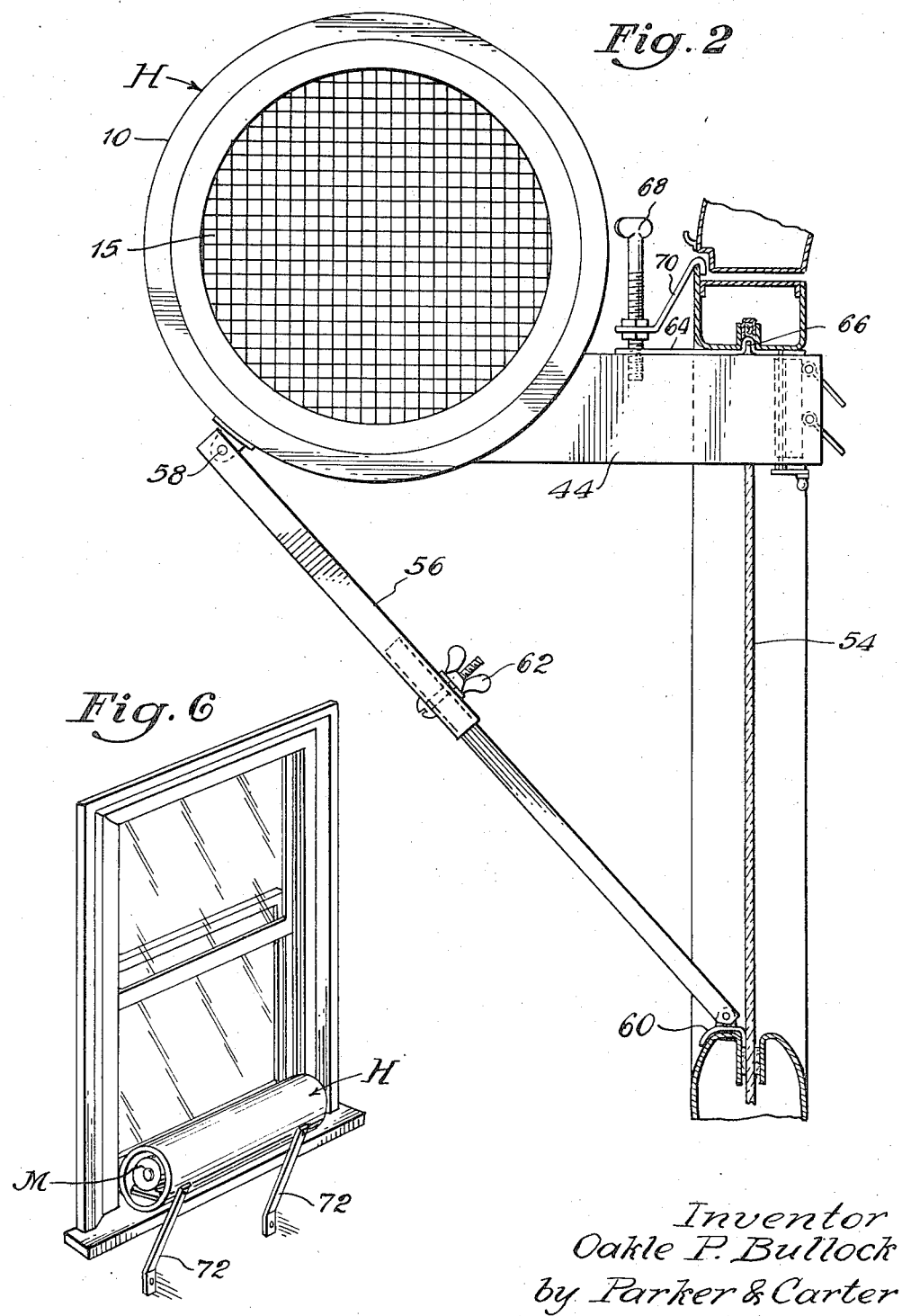

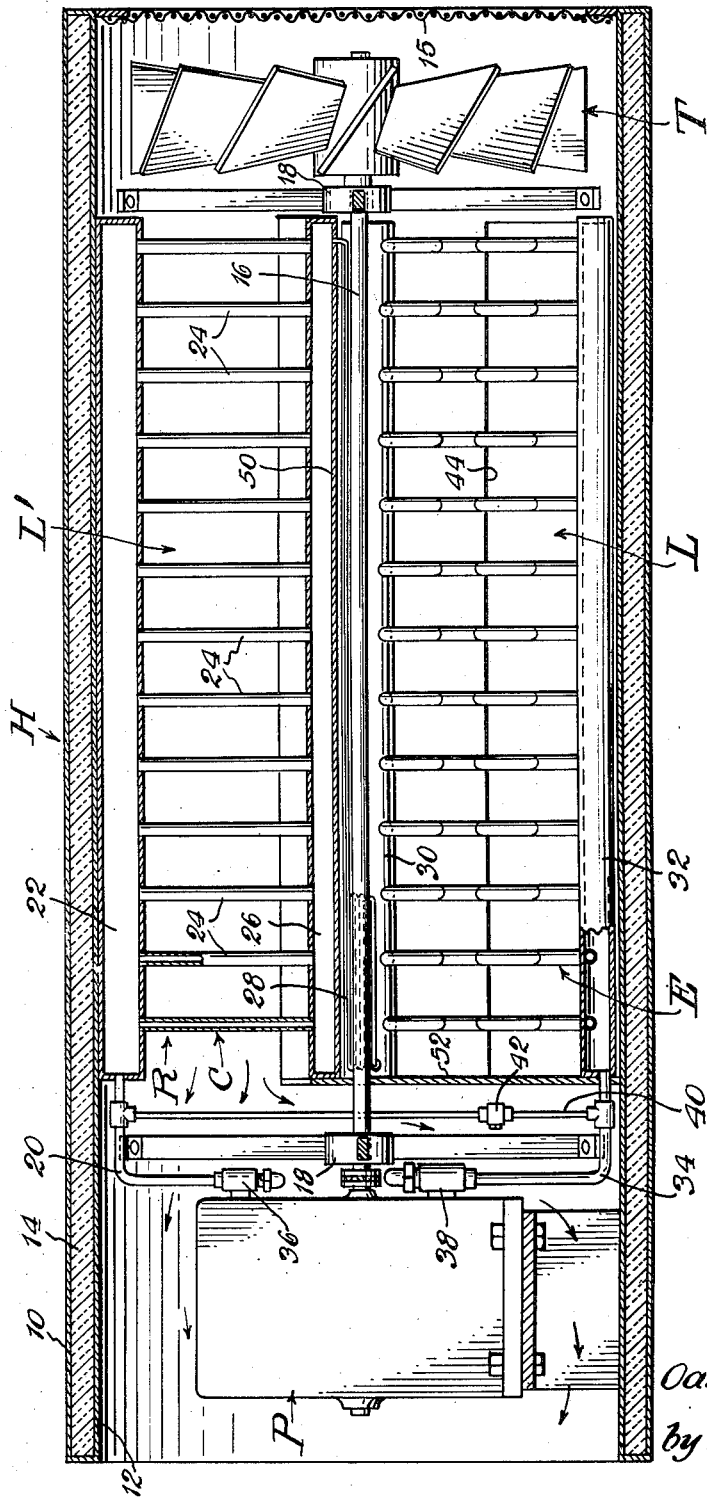

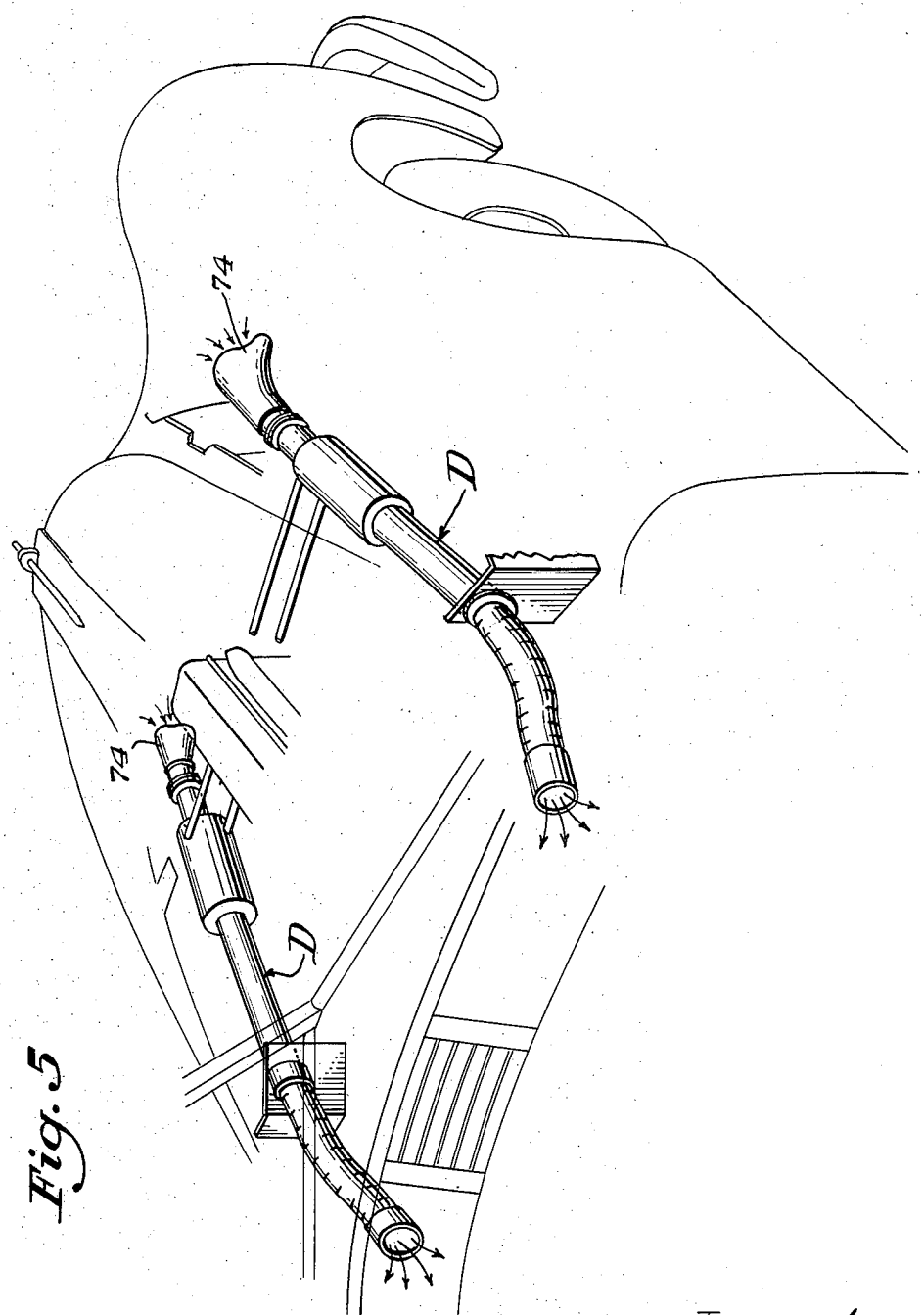

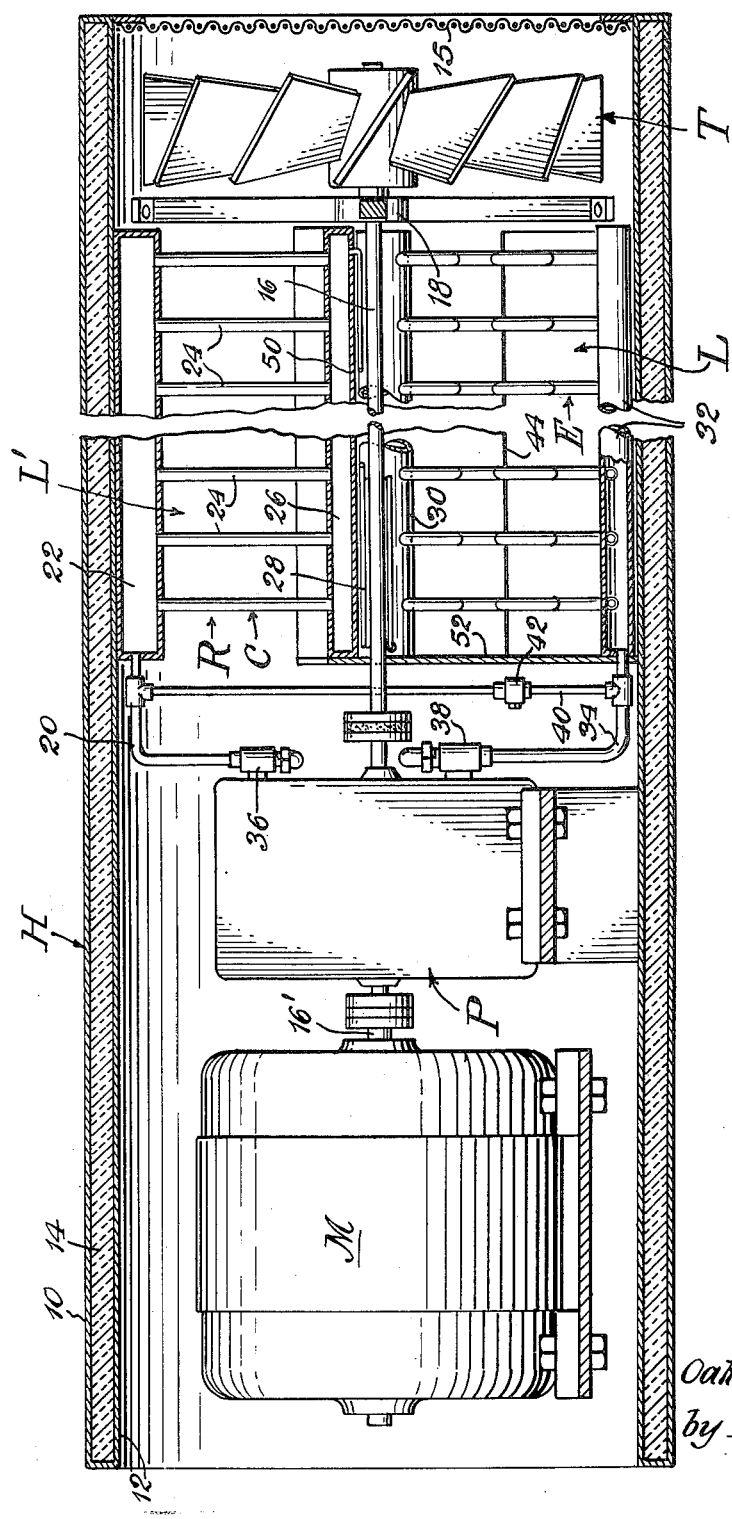

United States Patent Office 2,780,928
Patented Feb. 12, 1957

2,780,928

AUTOMOBILE AIR COOLER

Oakle P. Bullock, Wichita, Kans.

Application November 13, 1953, Serial No. 391,877

8 Claims. (Cl. 62—117)

My invention relates to improvements in the field of air conditioning generally, but more specifically, it relates to air conditioning or air cooling units, for automobiles or vehicles of all types but it is not necessarily limited to the cooling of just automobile bodies.

One object of my invention is an air conditioning unit for automobiles, or similar vehicles, the unit being adapted to substantially lower the temperature of the air inside of such vehicle while it is moving.

Another object of my invention is an air conditioning unit which can be easily and quickly adapted to various conventional automobile air conditioning systems without the necessity of numerous substitutions or substantial alterations.

Another object of my invention is an air conditioning unit of the above type which can be used for automobile air conditioning or house air conditioning.

Another object of my invention is to provide means for air cooling and the like which depends on the circulation of cold air through and the discharge of such air from the automobile body after it has served its cooling purpose.

Another object of my invention is to provide an air conditioning unit which so far as possible is made of standard parts, relatively inexpensive to manufacture, small in its overall dimensions and design, and light in weight, but at the same time, is sufficient in its operation and easily maintained and serviced.

Other objects will appear from time to time in the course of the specification and claims.

My invention is illustrated more or less diagrammatically in the accompanying drawings, wherein—

Figure 1 is a perspective view of an air cooler mounted on an automobile;

Figure 2 is a section along the line 2—2 of Figure 1;

Figure 3 is a section along the line 3—3 of Figure 1;

Figure 4 is a longitudinal section along the line 4—4 of Figure 3;

Figure 5 is a perspective view of the cooler as applied to the ventilating system of an automobile;

Figure 6 is a perspective view of a modified form of cooler as applied to the window of a house;

Figure 7 is a longitudinal section of the form shown in Figure 6.

Like parts are indicated by like characters throughout the specification and drawings.

In Figures 3 and 4, I have shown my new and improved air conditioning unit. The unit has an outer tubular housing H and a refrigeration unit R mounted in the housing.

The housing H is composed of an outer metal shell 10 and an inner metal shell 12 which is generally concentric with the outer shell. These two shells are spaced apart, and a suitable insulating material 14, such as fiber glass or the like, is inserted between them to suitably insulate the refrigerating unit. The forward end of the housing may be covered by a suitable screen 15.

The refrigerating unit R is composed generally of a condenser C, an evaporator E below the condenser, an air turbine T in the forward part of the housing and a compressor P in the rear end of the housing.

The air turbine T is mounted in the forward end of the housing on a shaft 16. The shaft extending approximately the full length of the housing is connected to the compressor P. The turbine T is of any conventional design and is adapted to be rotated by the rapidly moving air entering the forward end of the housing. The shaft is supported by a plurality of suitable bearings 18 positioned along it, the bearings being supported by any conventional spider structure within the housing.

The compressor P is a conventional refrigeration compressor and the details of it have not been illustrated or described as they form no part of the present invention. Suffice it to say that it is a conventional, easily purchased compressor of the rotary vane type. The compressed refrigerant passes through an outlet line 20 from the compressor to the condenser C and enters an upper condenser receiver 22. The refrigerant passes downwardly from the upper receiver 22 through a plurality of condenser coils or tubes 24, these being of any conventional type so that the heat of compression in the refrigerant can be withdrawn by the air moving over the tubes or coils. The tubes or coils 24 could be of the finned type, if desired. The tubes are connected to a lower condenser receiver 26, which is generally arcuate in formation and is disposed across the housing.

A capillary tube 28 is connected to the forward end of the lower receiver 26 and returns to the rear end of an upper evaporator receiver 30. It should be understood that an appropriate length of the capillary tube is provided so that proper expansion of the liquid refrigerant is acquired. The capillary tube is connected to the rear end of the upper evaporator receiver, and a plurality of evaporator tubes extend across the evaporator space downwardly from the upper evaporator receiver to a lower evaporator receiver 32.

The refrigerant is carried from the lower evaporator receiver 32 through an inlet line 34 back to the compressor P.

The outline line 20 and the inlet line 34 for the compressor are both provided with appropriate service valves 36 and 38 respectively so that refrigerant can be added to the system or removed, as desired. An auxiliary by-pass line 40 extends between the outlet and inlet lines and an unloader 42 is positioned in this pipe.

The housing has a laterally extending cool air supply duct 44 which extends through the side of the housing and is adapted to project into the automobile. This duct extends from the evaporator space to the automobile, and the end of it is provided with adjustable horizontal and vertical louvres 46 and 48 so that the direction of the cool air can be adjusted as its enters the automobile.

The lower surface 50 of the lower condenser receiver 26 acts as a partition and divides the interior of the housing H into two longitudinal spaces, the upper space L′ being a condenser space and the lower space L being an evaporator space. Air can flow freely through the upper space L′ from one end of the housing to the other. The lower space L is blocked off just behind the evaporator coils by a wall 52 so that all of the cool air passing over the evaporator coils in the lower space will be directed toward the cool air supply duct 44.

In summary, the unit is constructed and operates approximately as follows: The unit may be composed, for example, of a tubular housing approximately ten inches in diameter and twenty-four inches long. The housing is suitably insulated and is provided with a partition 50 which divides the housing into two longitudinal spaces. The upper space L′ is a condenser space and the lower space L is an evaporator space. At the front of the housing, the air turbine T is mounted on the shaft 16, which extends approximately the full length of the housing. The rear portion of the housing has the compressor P mounted in it, the compressor being driven by the shaft 16. The entire unit can be mounted by suitable brackets and clamps, as shown in Figure 1, on the window of an automobile and the air entering the forward end of the housing, due to the movement of the automobile, will rotate the air turbine and drive the compressor P. The gaseous refrigerant is compressed through the line 20. The warm liquid flows from the upper receiver 22 downwardly through the tubes or coils 24 where the heat of compression is removed by the air moving over the coils. From the lower condenser receiver 26, the cooled liquid flows through the capillary tube 28 to the upper evaporator receiver 30, the capillary tube functioning as an expansion valve. The liquid refrigerant expands and vaporizes in the evaporator coils and withdraws the heat from the air passing through the lower space L of the housing. The air is directed by the wall 52 and the duct 44 into the automobile. The gaseous refrigerant is returned by the line 34 to the compressor P and the cycle is repeated.

If the automobile is moving at a very rapid rate of speed, the turbine T could drive the compressor too fast. I have provided a check relief valve or unloader 42 which by-passes both the condenser and the evaporator and returns the refrigerant directly to the low side of the compressor.

To prevent the fan from operating the pump at too great a rate of speed when the automobile is moving very rapidly, a conventional governor arrangement could be provided.

In Figure 2, I have shown a mechanism for mounting this air conditioning unit on the side of an automobile. The duct 44 is inserted through the window adjacent the top so that when the window glass 54 is rolled up, it will clamp the duct. A pair of extendable supporting brackets 56 are pivotally connected to the side of the housing, as at 58, and each of them has a clamp 60 adapted to rest on the side of the door structure. Each of the brackets is made in two sections with a wing nut bolt, and slot connection 62 between the two sections so that they can be easily and quickly adjusted.

A plate 64 is mounted on the upper surface of the nozzle and has a ridge 66 adapted to project into the window receiving slot in the door frame to position the duct 44 with respect to the door frame.

A number of suitable bolts 68 on the duct carry clamps 70 which fit over the edge of the door frame so as to rigidly connect the duct and the housing to the upper edge of the frame.

Suitable resilient strips could be mounted along the upper and lower surfaces of the duct as well as on the clamps 60 and 70. However, these are features of design and form no part of the present invention.

In Figures 6 and 7, I have shown the same basic unit converted into a room conditioner. A motor M is mounted on an extension of the shaft 16′ and a fan F drives the air over the condenser and evaporator as well as driving the compressor. The details of the housing, the evaporator, the condenser and the refrigerator system can be in general the same.

The housing is mounted in a window opening by a suitable supporting means 72. The motor M is positioned in the housing to drive the fan because there is no moving air and it is necessary to force air over the condenser and the evaporator. Because of the motor, the unit will have to be used in conjunction with a source of electric current and the housing will have to enclose the motor. Suitable wiring and the necessary switches will also have to be provided.

This same basic unit could easily be used in combination with the ventilating system of an automobile. In Figure 5, I have shown schematically the unit and its housing positioned in the air intake ducts D of such a ventilating system. The compressor is driven by the water pump, the moving water from the water pump passes through a simple water turbine mounted on the shaft in the housing on its way to the engine cooling system. The air intakes 74 for the air conditioning units are positioned in the forward part of the automobile directly in front of the grill, and air is taken back through the evaporator coils of the condenser. That portion of the air passing over the condenser will be exhausted outside of the car body and the cool air from the evaporator coils will be drawn through the normal air ventilating system into the interior of the car to cool the occupants.

While I have shown and described the preferred form and one modification of my invention, it should be understood that many changes, alterations, modifications and substitutions can be made without departing materially from the fundamental theme. I wish, therefore, that my showing be taken in a large sense as diagrammatic rather than limiting me to the precise showing. For example, the housing could be any desired shape even though I have shown it as tubular or cylindrical. The size and dimensions of the parts are unimportant as long as they fit within the general scheme. The basic unit can be used in any location in combination with any associated conventional mechanism as long as the capacity of the unit is adequate.

The use and operation of my invention are as follows:

Referring specifically to automobile body cooling, it is well known that the automobile manufacturers are today providing built-in mechanisms for cooling the interior of an automobile body. In every instance that I have been able to find, this has taken the form of circulating and recirculating air through the body, sometimes with and sometimes without the addition of air from the outside of the body.

Much emphasis has been lain by the designers and manufacturers of such automobile air coolers, on the necessity of draftless circulation of cold air and therefore for the ordinary automobile an ice machine of two or three tons capacity, the compressor of which is driven by a motor of two or more horsepower or the automobile engine crank shaft is required. This means substantial weight and size, and even if some new air is introduced, it presents a substantial danger to the occupants of the vehicle in the event of leakage of products of combustion, carbon monoxide and the like from the engine into the vehicle body.

I propose, on the contrary, to use a refrigerating machine of much lower capacity, for example, one-half ton, the compressor of which can be driven by the movement of the air past the automobile. When the apparatus is exposed outside the vehicle, the movement of the vehicle at speeds above approximately fifteen miles per hour through the ambient air may, when applied to an air turbine or air wheel, provide sufficient power to operate the compressor. If desired, without appreciably overloading the engine cooling system, the coolant discharged by the pump might be used as the motive power to drive a hydraulic turbine to operate the compressor. The turbine discharge having done work would be somewhat cooled and would be at least as effective a coolant for the engine as the coolant discharged directly from the pump.

In one form of my device, I propose a tubular housing for example, eight inches in diameter and twenty-two inches long, supported on a framework outside the vehicle body, its axis being parallel with the line of movement of the body so that an air motor in the forward end of the housing would be exposed to the air current entering and passing through the housing as a result of the vehicle movement. This air motor would drive a shaft which in turn would drive a compressor at the rear end of the housing. The upper portion of the condenser would contain a receiver joined by heat exchange tubes to a lower receiver adjacent the center of the housing. The compressor would supply compressed hot refrigerant to the upper receiver at its rear end. A capillary tube would receive the discharge from the lower receiver of the condenser at its forward end, would carry the liquid back to the front end of a simple evaporator, the evaporator having an upper receiver connected at its front end to the capillary tube, the upper receiver being immediately below the central axis of the housing, which receiver would be joined by heat exchange coils to a lower discharge receiver, the two receivers and coils forming the evaporator. The refrigerant would return from the rear end of the lower receiver to the compressor, there being the usual safety by-pass.

It should be noted that the flow of the refrigerant from the point of introduction into the condenser to the point of its exhaust from the evaporator back to the pump is all downward. Thus the oil entrained with the refrigerant will not be trapped and form a blocking point any place in the system.

By this arrangement, since the air enters the forward end of the housing and is discharged from the rear end and since the refrigerant both in the condenser and in the evaporator would be moving forwardly, I obtain a desired counter flow movement of the refrigerant and the air. A horizontal partition would divide the air as it moves longitudinally through the housing. The air heated by the condenser would be discharged outside the vehicle from the rear end of the housing, the air cooled by the evaporator being discharged into the vehicle at a relatively high velocity depending on the speed of the vehicle so that the cold air would enter at relatively high velocity. The cooling effect on the occupant or occupants of the car would come from the cooling of the air, plus the impingement of the moving air on the occupants, similar to the cooling effect produced by a fan in a room displacing ambient air, and creating a moving air current over the occupants of the room producing a sensible cooling effect.

In Figure 5, I have shown a special application to conventional automobile heating systems. If the automobile cooling pump furnishes the power to drive hydraulically the turbine to operate the compressor, the air is circulated by the movement of the car or perhaps also by whatever fan may be installed as a normal part of the heating plant of the automobile, if it is desired not to cool the car, the refrigerating apparatus may be cut out of operation by by-passing the water around in any suitable way either by valves or by-pass or disconnection. Under some circumstances, however, it may be desirable to merely transpose the air flow so that the cold air associated with the evaporator would be discharged outside the body of the vehicle while the air warmed by the condenser and compressor would be discharged into the vehicle.

As illustrated in the drawings, the front open end of the housing H forms a scoop to gather air to operate the air turbine which air is frequently discharged from the rear end of the housing. Under some circumstances, it may be desirable to have the scoop larger in diameter than the body of the housing so as to increase the cubic footage of air discharged by the scoop against the air turbine. Under other circumstances it may be desirable to have the air picked up by a scoop which is not necessarily in line with the axis of the housing; so long as the air enters the housing to drive the air turbine and passes rearwardly through the housing so that the exhaust of air from the housing is not interfered with by the presence of the scoop adjacent the front end of the housing, the device will operate. Whether the air discharges in line with the axis of the housing or inclined thereto or at right angles thereto so long as there is movement of air through the air turbine and then through the condenser and evaporator coil area for discharge from the housing, the device will operate.

While I have shown for convenience that the compressor is driven hydraulically as a result of the pressure circulation of the coolant, it will be obvious that other means of driving the compressor as a result of engine operation might also be used.

I claim:

1. In an air conditioning unit for use on automobiles or the like, an elongated housing generally open at both ends to provide for the flow of air through the housing, a refrigerating unit within the housing for the compression and expansion of a refrigerant, the unit including a compressor, a condenser in communication with the compressor, expansion means between the condenser and evaporator, the evaporator being in communication with the compressor, an air turbine in the housing for operating the compressor, adapted to be rotated by air flow through the housing responsive to the movement of the automobile, a portion of the housing being divided longitudinally into two chambers, the condenser approximately filling one chamber, and the evaporator filling the other so that air entering the forward end of the housing will pass through either the condenser or the evaporator, the air turbine being positioned at the open front end of the housing, the compressor being positioned at the open rear end, means for discharging the air that passes through the evaporator separately from the air that passes through the condenser, means on the housing for detachably connecting it to the window frame of an automobile, and a duct in communication with the evaporator space for directing the air passing through the evaporator space into the automobile body.

2. The structure of claim 1 wherein the space for the condenser is generally above the space for the evaporator so that the refrigerant flow will be generally downward.

3. The structure of claim 2 wherein the condenser, the evaporator, and compressor are connected together in such a manner that the refrigerant flow through the condenser and evaporator will be generally against the current of the air flow through the housing.

4. In an air conditioning unit, an elongated housing generally open at its front and rear ends to provide for the flow of air through the housing, a refrigerating unit within the housing for the compression and expansion of a refrigerant, the unit including a compressor, a condenser in communication with the compressor, expansion means between the condenser and evaporator, the evaporator being in communication with the compressor in a closed circuit, a fan mounted within the housing at its front end and coupled to the compressor, the housing being divided longitudinally generally into two spaces, the condenser approximately filling one space and the evaporator approximately filling the other so that air entering the front end of the housing will pass through either the condenser or the evaporator, and means for dividing the air and for discharging the air that passes through the evaporator separately from the air that passes through the condenser, the air that passes through the condenser space discharging through the open rear end of the housing.

5. In an air conditioning unit, an elongated housing generally open at both ends to provide for the flow of air through it, a refrigerating unit within the housing for the compression and expansion of a refrigerant, including a compressor, a condenser in communication with the compressor, an evaporator in communication with the condenser, expansion means between the condenser and evaporator, the evaporator being in communication with the compressor, the forward open end of the housing having a fan disposed in it so as to substantially fill the opening, the housing behind the fan being divided into two spaces, one above the other, one containing the evaporator, the other containing the condenser so that air entering the forward end of the housing will pass through either the condenser or the evaporator, the compressor being positioned behind the evaporator and condenser and aligned with both of them, means for exhausting the air that passes through the evaporator separately from the air that passes through the condenser, and means for operating the compressor.

6. The structure of claim 5 in which the fan is an air turbine and is connected to the compressor to drive it.

7. The structure of claim 5 in which said last mentioned means includes a motor mounted in the housing behind the compressor, the motor being connected to the compressor and fan to drive them.

8. The structure of claim 5 in which the condenser is positioned above the evaporator.

References Cited in the file of this patent

UNITED STATES PATENTS

| | | |
|---|---|---|
| 2,028,046 | Calatroni | Jan. 14, 1936 |
| 2,398,655 | Mayer | Apr. 16, 1946 |
| 2,438,120 | Freygang | Mar. 23, 1948 |
| 2,443,472 | Mayo et al. | June 15, 1948 |